United States Patent
Ichinokawa

(10) Patent No.: US 6,599,035 B2
(45) Date of Patent: Jul. 29, 2003

(54) LENS DRIVE SYSTEM

(75) Inventor: Kazuhiro Ichinokawa, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/157,127

(22) Filed: May 30, 2002

(65) Prior Publication Data

US 2002/0181953 A1 Dec. 5, 2002

(30) Foreign Application Priority Data

May 31, 2001 (JP) ........................................ 2001-164058

(51) Int. Cl.[7] ............................................... G03B 17/04

(52) U.S. Cl. ....................................................... 396/349

(58) Field of Search ................................. 396/348, 349, 396/350; 359/823

(56) References Cited

U.S. PATENT DOCUMENTS 5,408,285 A * 4/1995 Azegami et al. ............ 396/349

* cited by examiner

*Primary Examiner*—Russell Adams
*Assistant Examiner*—Arthur A Smith
(74) *Attorney, Agent, or Firm*—Greenblum & Bernstein, P.L.C.

(57) ABSTRACT

A lens drive system includes a lens case supporting an image pick-up device; a movable lens frame supporting a lens group; a reversible motor supported by the lens case; a feed screw supported by the lens case and driven by the reversible motor; a half nut which moves together with the movable lens frame, is normally engaged with the feed screw, and is disengaged from the feed screw to slide thereon when more than a predetermined force is applied to the half nut in optical axis direction; and a plurality of ribs formed in the lens case projecting inwards behind a space for movement of the movable lens frame. Each rib includes a stop surface which comes into contact with a rear surface of the movable lens frame when the movable lens frame retreats while the half nut is sliding on the feed screw.

9 Claims, 2 Drawing Sheets

LENS DRIVE SYSTEM

BACKGROUND OF THE INVENTION

1. Field of the Invention

The present invention relates to a lens drive system which can be used for digital cameras.

2. Description of the Related Art

As an example of a conventional digital camera, a digital camera wherein a camera body is provided with a movable lens frame which supports a lens group, and is further provided in the camera body with a lens drive motor and a lens drive mechanism so that the movable lens frame is driven by the lens drive motor via the lens drive mechanism to move in an optical axis direction between an accommodation position, wherein the movable lens frame is accommodated within the camera body, and an extended position (ready-to-photograph position), wherein the lens frame projects forward from the front of the camera body, is known in the art.

In this type digital camera, if the camera is accidentally dropped on the ground with the movable lens frame in the extended position, the movable lens frame may hit the ground to thereby cause the rear end of the movable lens frame to impact against an inner part of the camera body behind the rear end of the movable lens frame. If this happens, the lens drive mechanism may be damaged. To prevent this problem from occurring, it is sometimes the lens drive mechanism is provided with a half nut which is normally engaged with a feed screw (feed screw shaft), but is disengaged from the feed screw to slide on the feed screw when more than a predetermined force is applied to the half nut in the axial direction thereof. Such a half nut prevents the lens drive mechanism from being damaged to some extend. However, if the movable lens frame is forced to retreat beyond the range of movement thereof, the lens drive mechanism may be totally damaged. As a consequence, the lens frame may remain jammed even if the lens drive motor is driven again.

To prevent such a problem from occurring, it is known in the art to provide in the camera, behind the movable lens, with some type of stop member which prevents the movable lens frame from retreating beyond the range of movement thereof. However, the placement and the size and shape of such stop member are limited in a digital camera which is designed extremely small and compact.

SUMMARY OF THE INVENTION

The present invention provides a lens drive system which is structured so as not to be deformed or damaged even if a large external force is unintentionally applied to the movable lens frame to thereby cause the movable lens frame to retreat beyond the range of movement thereof, while making effective use of an inner space of the camera body.

The present invention further provides a lens drive system which is structured so that the optical axis of the lens group supported by the movable lens frame does not easily tilt upon contact of the movable lens frame with the stop member.

For example, in an embodiment, a lens drive system is provided, including a lens case which supports an image pick-up device; a movable lens frame which supports a lens group via which an image is focused on the image pick-up device, the movable lens frame being guided linearly in an optical axis direction thereof, the front of the movable lens frame being projectable forward from the lens case; a reversible motor which is supported by the lens case; a feed screw supported by the lens case to be driven by the reversible motor; a half nut which moves together with the movable lens frame in the optical axis direction, wherein the half nut is normally engaged with the feed screw, and is disengaged from the feed screw to slide on the feed screw when more than a predetermined force is applied to the half nut in the optical axis direction; and a plurality of ribs formed integral with the lens case which project from an inner surface of the lens case behind a space for movement of the movable lens frame. Each of the plurality of ribs includes a stop surface formed at an end of the each rib which faces the movable lens frame, the stop surfaces coming into contact with a rear surface of the movable lens frame when the movable lens frame retreats while the half nut is sliding on the feed screw.

It is desirable for the number of the plurality of ribs to be more than two.

The plurality of ribs can define a plane which is perpendicular to the optical axis.

The lens drive system can be provided in a digital camera.

The movable lens frame can be guided in the optical axis direction between an extended position, wherein the movable lens frame projects forward from a front wall of the digital camera, and an accommodation position wherein the movable lens frame is fully accommodated in the digital camera.

It is desirable for the movable lens frame to be biased forwardly, toward the extended position, by a spring member.

It is desirable for the movable lens frame to include at least one guide projection which is slidably engaged in a guide groove formed on an inner surface of the lens frame.

In another embodiment, a lens drive system of a camera is provided, including a movable lens frame which supports an image-forming lens group, and is guided linearly in an optical axis direction to be movable between an extended position, wherein the movable lens frame projects forward from a front wall of the camera, and an accommodation position wherein the movable lens frame retracts into the camera; a feed screw which extends in the optical axis direction; a motor which can rotate the feed screw in forward and reverse directions about an axis thereof; a half nut which moves together with the movable lens frame in the optical axis direction, wherein the half nut is normally engaged with the feed screw, and is disengaged from the feed screw to slide on the feed screw when more than a predetermined force is applied to the half nut in the optical axis direction; a support member which supports the movable lens frame, the feed screw, the motor and the half nut; and a plurality of ribs formed integral with the support member which project inwards from an inner surface of the support member behind a space for movement of the movable lens frame. A front end face of each the plurality of ribs comes into contact with a rear surface of the movable lens frame when the movable lens frame retreats beyond the accommodation position thereof while the half nut is sliding on the feed screw.

It is desirable for the front end faces of the plurality of ribs to lie in a plane perpendicular to the optical axis direction.

The present disclosure relates to subject matter contained in Japanese Patent Applications No.2001-164058 (filed on May 31, 2001), which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
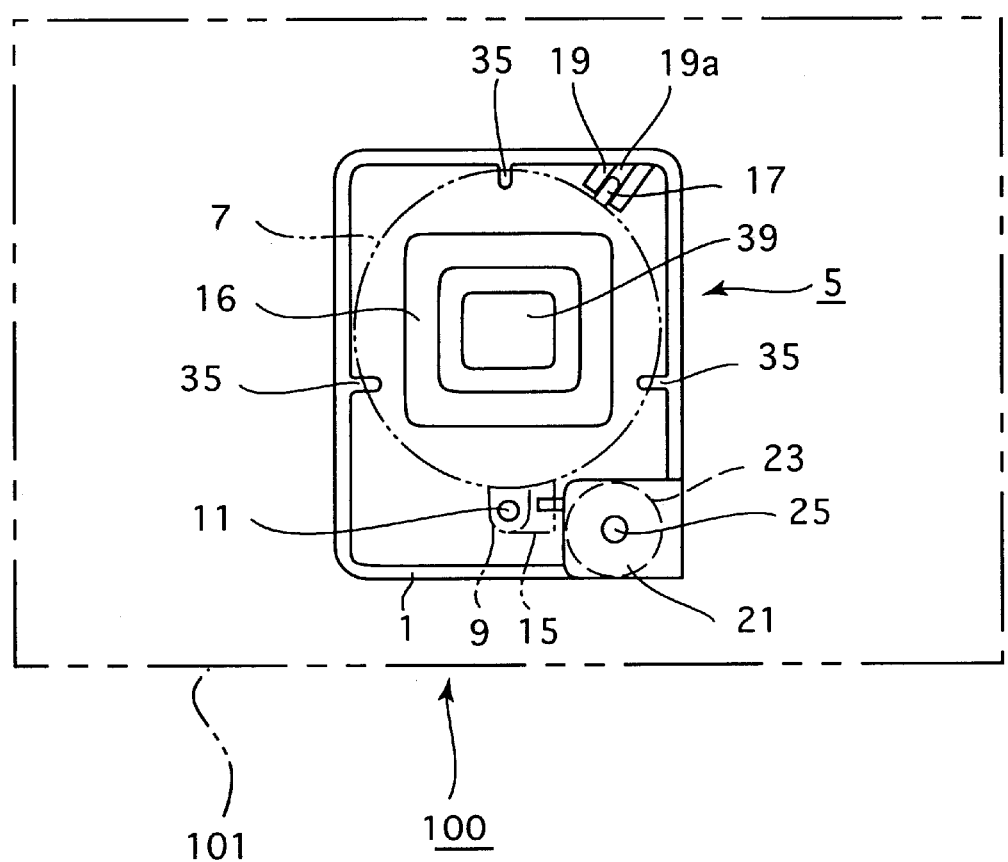
FIG. 1 is a front elevational view of a fundamental portion of a digital camera which is provided with an embodiment of a lens drive system according to the present invention.
Figure 2:
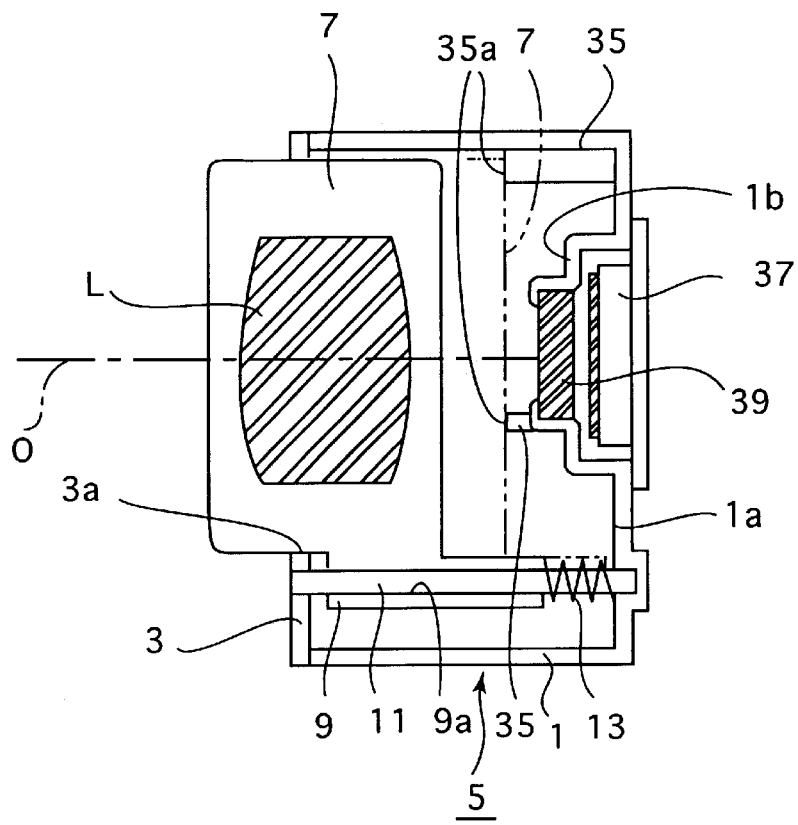
FIG. 2 is a longitudinal sectional view of the fundamental portion shown in FIG. 1.
Figure 3:
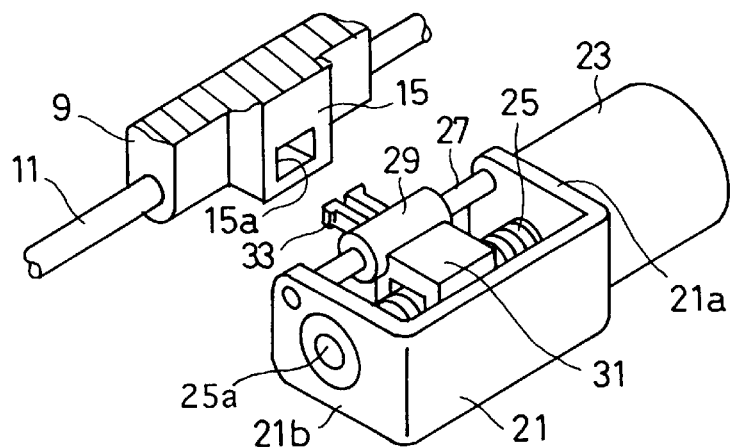
FIG. 3 is an exploded perspective view of a fundamental portion shown in FIGS. 1 and 2.

FIGS. 1, 2 and 3 show a fundamental portion of a digital camera 100 which is provided with an embodiment of a lens drive system according to the present invention. The digital camera 100 is of a type having a fixed-focal-length lens.

The digital camera 100 is provided in a camera body 101 thereof with a housing 5 which includes a box-shaped lens case (support member) 1 and a cover 3. The digital camera 100 is provided in the lens case 1 with a movable lens frame 7 which supports a lens group (image-forming lens group) L of a photographing lens system of the digital camera 100, and is guided along an optical axis O of the lens group L. The front end of the lens case 1 is open so that the movable lens frame 7 can project forward from the front end of the lens case 1. The cover 3 is fixed to the front end of the lens case 1 to close an annular opening between the front end of the lens case 1 and the outer peripheral surface of the movable lens frame 7. The cover 3 is provided with a circular opening 3a through which the movable lens frame 7 projects forward from the front surface of the cover 3 (see FIG. 2). FIG. 1 shows a state where the cover 3, the lens group L and the movable lens frame 7 are removed from the lens case 1.

The movable lens frame 7 is provided on a bottom portion thereof with a support projection 9 which is elongated in the optical axis direction. The support projection 9 is provided with a guide hole 9a which extends through the support projection 9 in the optical axis direction. A guide shaft 11, whose front and rear ends are respectively supported by the cover 3 and a rear wall 1a of the lens case 1, which extends in the optical axis direction is fitted in the guide hole 9a so that the support projection 9 can slide along the guide shaft 11. A helical compression spring 13 is fitted on the guide shaft 11 to be held and compressed between the rear end of the support projection 9 and the rear wall 1a of the lens case 1. The support projection 9 of the movable lens frame 7 is biased forward in the optical axis direction by the helical compression spring 13. As shown in FIG. 3, the support projection 9 is provided on a right surface thereof with an engaging protrusion 15 having an engaging hole 15a.

As shown in FIG. 1 by a two-dot chain line, the movable lens frame 7 is provided on an outer peripheral surface thereof with a guide projection 17, while the lens case 1 is provided on an inner peripheral surface thereof with a pair of guide projections 19 which are elongated in the optical axis direction, and a guide groove 19a formed in between the pair of guide projections 19 therealong in which the guide projection 17 of the movable lens frame 7 is slidably engaged.

With the above described guide structure, the movable lens frame 7 is guided in the optical axis direction via the guide shaft 11 and the pair of guide projections 19, which are positioned on substantially upper and lower sides of the movable lens frame 7, to be movable between an extended position (ready-to-photograph position) shown in FIG. 2, in which the movable lens frame 7 projects from the front of the housing 5 by a large amount, and an accommodation position (not shown) in which the movable lens frame 7 projects only slightly from the front of the housing 5.

The movable lens frame 7 projects from the front of the camera body 101 when the movable lens frame 7 is driven to advance to the extended position, and the movable lens frame 7 is fully accommodated in the camera body 101 when the movable lens frame 7 is driven to retreat to the accommodation position.

A support frame 21 having a substantially square U-section is positioned inside the lens case 1 to be fixed to the lower right corner of the lens case 1 as viewed in FIG. 1. A reversible step motor (lens drive motor) 23 is fixed to a rear surface of a rear wall 21a of the support frame 21. The step motor 23 has a feed screw (feed screw shaft) 25 as a rotating shaft thereof which extends in the optical axis direction. As shown in FIG. 3, the peripheral surface of the feed screw 25 is threaded. The feed screw 25 extends through the rear wall 21a of the support frame 21, while a front end 25a of the feed screw 25 is rotatably supported by a front wall 21b of the support frame 21. The step motor 23 and the feed screw 25 are supported by the lens case 1 via the support frame 21.

A guide shaft 27 which extends parallel to the feed screw 25 is fixed to the support frame 21 to be held between the front wall 21b and the rear wall 21a in a non-rotatable fashion. A cylindrical movable member 29 is fitted on the guide shaft 27 to be slidable thereon in the optical axis direction. A half nut 31 made of synthetic resin which has a substantially square U-section is fixed to a right side face (with respect to FIGS. 1 and 3) of the movable member 29 so that an open portion of the square U-section of the half nut 31 faces downwards as seen from front of the half nut 31. A threaded portion (not shown) formed on an inner peripheral surface of the half nut 31 is in mesh with the threaded portion of the feed screw 25. The half nut 31 is normally in mesh with the feed screw 25, but is disengaged from the feed screw 25 to slide on the feed screw 25 when more than a predetermined force is applied to the half nut 25 in the axial direction (optical axis direction) thereof.

A split engaging projection 33 is fixed to a left side face of the movable member 29 to project toward the support projection 9 of the movable lens frame 7. The split engaging projection 33 is engaged in the engaging hole 15a to couple the movable member 29 to the movable lens frame 7 via the support projection 9.

As shown in FIGS. 1 and 3, the lens case 1 is provided, on an inner surface thereof in the vicinity of the rear end of the lens case 1, with a set of three ribs (stop members) 35 (only two of them appear in FIG. 2) which are elongated in the optical axis direction. The set of three ribs 35 are formed integral with the lens case 1. The rear end of each rib 35 extends to the rear wall 1a of the lens case 1 to be integral therewith. As shown in FIG. 1, two of the three ribs 35 project inwardly in opposite directions from the right and left walls of the lens case 1, respectively, while the remaining one rib 35 projects inwardly downwards from the top wall of the lens case 1. The front end surface 35a of each rib 35 which serves as a stop surface comes into contact with a rear surface of the movable lens frame 7 when the movable lens frame 7 retreats beyond the accommodation position thereof. The front end surfaces 35a of the set of three ribs 35 define a plane which is perpendicular to the optical axis O. In other words, the three ribs lie in a plane perpendicular to the optical axis O.

A CCD 37 serving as a solid-state image sensor (image pick-up device) is fixed to the center of the rear wall 1a of the lens case 1 so that the light receiving surface of the CCD 37 faces forwards. A filter 39 is disposed in front of the CCD 37 between the CCD 37 and the lens group L. The filter 39 is supported by a support portion 1*b* of the lens case 1 which is formed on the rear wall 1*a* and protrudes forward from the rear wall 1*a*.

A light bundle reflected by an object passes through the lens group L and the filter 39 to be focused as an object image on the CCD 37. This object image focused on the CCD 37 is converted into an image signal to be transmitted to a controller (not shown) provided in the camera body 101. The controller activates a display such as an LCD panel (not shown) provided on the camera body 101 to indicate the object image thereon. At the same time, the controller commands a built-in storing device such as a memory card (not shown) to store the digital image data of the object image in the built-in storing device.

The lens case 1, the movable lens frame 7, the reversible step motor 23, the feed screw 25 and the half nut 31 are fundamental elements of the present embodiment of the lens drive system for driving the lens group L in the optical axis direction.

Operations of the present embodiment of the lens drive system will be hereinafter discussed.

In a state where the movable lens frame 7 is in the accommodation position thereof, driving the step motor 23 to rotate in a forward direction causes the feed screw 25 to rotate to thereby advance the movable lens frame 7 and the movable member 29 together, which are integral with the half nut 31. Subsequently, the step motor 23 stops rotating immediately after the movable lens frame reaches the extended position thereof.

In a state where the movable lens frame 7 is in the extended position thereof, driving the step motor 23 to rotate in a reverse direction causes the feed screw 25 to rotate to thereby retract the movable lens frame 7 and the movable member 29 together with the half nut 31. Subsequently, the step motor 23 stops rotating immediately after the movable lens frame reaches the accommodation position thereof.

In a state where the movable lens frame 7 is in the extended position thereof, if a large external force is applied to the movable lens frame 7 in a direction to retreat the movable lens frame 7, the half nut 31 is resiliently deformed and slides on the feed screw 25 rearwards. In this case, the movable lens frame 7 together with the half nut 31 can retreat beyond the accommodation position thereof.

Even if such a large external force is applied, the rear surface of the movable lens frame 7 reliably abuts against the front end surfaces 35*a* of the set of three ribs 35. This reliably prevents the movable lens frame 7 from retreating beyond the range of movement thereof, i.e., prevents the lens drive mechanism from being totally damaged. Accordingly, this ensures a proper driving of the movable lens frame 7 by rotation of the step motor 23 even after the rear surface of the movable lens frame 7 abuts against the front end surfaces 35*a* of the set of three ribs 35. Since the front end surfaces 35*a* serving as stop surfaces lie in a plane perpendicular to the optical axis O so that the movable lens frame 7 can abut against the front end surfaces 35*a* at the same time, the movable lens frame 7 does not tilt with respect to the optical axis O upon abutting against the front end surfaces 35*a*.

Accordingly, even if a large external force is applied to the movable lens frame 7 in a direction to retreat the movable lens frame 7 from the extended position thereof, there is little possibility of the support projection 9, the guide shaft 11, the guide projection 17, the guide groove 19*a*, the split engaging projection 33 and the engaging hole 15*a* being deformed. Moreover, there is little possibility of the guide projection 17 and the engaging projection 33 being disengaged from the guide groove 19*a* and the engaging hole 15*a*, respectively. In the subsequent lens drive operation, the movable lens frame 7 can reliably advance to the extended position thereof again by forward rotation of the step motor 23, and afterwards can reliably retreat to the accommodation position thereof by reverse rotation of the step motor 23.

The set of three ribs 35 serve not only as stop members for the movable lens frame 7 but also as reinforcing members which reinforce the housing 5, which makes effective use of the inner space of the housing 5.

The lens drive system according to the present invention can be incorporated not only in a fixed-focal-length type digital camera, but also in a zoom type digital camera or any type camera other than digital camera.

Although the number of ribs formed on the lens case 1 is three in the above described particular embodiment, the number of ribs is not limited solely to three, but can be any number as long as the number of ribs is at least two.

As can be understood from the above description, a lens drive system which is structured so as not to be deformed or damaged even if a large external force is unintentionally applied to the movable lens frame to thereby cause the movable lens frame to retreat beyond the range of movement thereof, while making effective use of an inner space of the camera body, is achieved.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A lens drive system comprising:
    a lens case which supports an image pick-up device;
    a movable lens frame which supports a lens group via which an image is focused on said image pick-up device, said movable lens frame being guided linearly in an optical axis direction thereof, the front of said movable lens frame being projectable forward from said lens case;
    a reversible motor which is supported by said lens case;
    a feed screw supported by said lens case to be driven by said reversible motor;
    a half nut which moves together with said movable lens frame in the optical axis direction, wherein said half nut is normally engaged with said feed screw, and is disengaged from said feed screw to slide on said feed screw when more than a predetermined force is applied to said half nut in the optical axis direction; and
    a plurality of ribs formed integral with said lens case which project from an inner surface of said lens case behind a space for movement of said movable lens frame;
    wherein each of said plurality of ribs includes a stop surface formed at an end of said each rib which faces said movable lens frame, said stop surfaces coming into contact with a rear surface of said movable lens frame when said movable lens frame retreats while said half nut is sliding on said feed screw.

2. The lens drive system according to claim 1, wherein the number of said plurality of ribs is more than two.

3. The lens drive system according to claim 1, wherein said plurality of ribs define a plane which is perpendicular to said optical axis.

4. The lens drive system according to claim 1, wherein said lens drive system is provided in a digital camera.

5. The lens drive system according to claim 4, wherein said movable lens frame is guided in said optical axis direction between an extended position, wherein said movable lens frame projects forward from a front wall of said digital camera, and an accommodation position wherein said movable lens frame is fully accommodated in said digital camera.

6. The lens drive system according to claim 5, wherein said movable lens frame is biased forwardly, toward said extended position, by a spring member.

7. The lens drive system according to claim 1, wherein said movable lens frame comprises at least one guide projection which is slidably engaged in a guide groove formed on an inner surface of said lens frame.

8. A lens drive system of a camera, comprising:
   a movable lens frame which supports an image-forming lens group, and is guided linearly in an optical axis direction to be movable between an extended position, wherein said movable lens frame projects forward from a front wall of said camera, and an accommodation position wherein said movable lens frame retracts into said camera;
   a feed screw which extends in said optical axis direction;
   a motor which can rotate said feed screw in forward and reverse directions about an axis thereof;
   a half nut which moves together with said movable lens frame in said optical axis direction, wherein said half nut is normally engaged with said feed screw, and is disengaged from said feed screw to slide on said feed screw when more than a predetermined force is applied to said half nut in said optical axis direction;
   a support member which supports said movable lens frame, said feed screw, said motor and said half nut; and
   a plurality of ribs formed integral with said support member which project inwards from an inner surface of said support member behind a space for movement of said movable lens frame;
   wherein a front end face of each said plurality of ribs comes into contact with a rear surface of said movable lens frame when said movable lens frame retreats beyond said accommodation position thereof while said half nut is sliding on said feed screw.

9. The lens drive system according to claim 8, wherein said front end faces of said plurality of ribs lie in a plane perpendicular to said optical axis direction.

* * * * *